United States Patent [19]

Sato

[11] 3,768,814

[45] Oct. 30, 1973

[54] CASSETTE TAPE RECORDER

[75] Inventor: Masaaki Sato, Tokyo, Japan

[73] Assignee: Olympus Optical Co., Ltd., Tokyo, Japan

[22] Filed: Dec. 16, 1970

[21] Appl. No.: 98,714

[30] Foreign Application Priority Data

| | | |
|---|---|---|
| Dec. 18, 1969 | Japan | 44/101508 |
| Dec. 18, 1969 | Japan | 44/101509 |
| Mar. 20, 1970 | Japan | 45/26595 |
| Mar. 20, 1970 | Japan | 45/26596 |

[52] U.S. Cl. .................. 274/4 E, 242/198

[51] Int. Cl. .................. G11b 5/00

[58] Field of Search .................. 242/198–200; 274/4 E; 179/100.2 Z

[56] References Cited

UNITED STATES PATENTS

| | | | |
|---|---|---|---|
| 3,598,339 | 10/1971 | Saito | 274/4 E |
| 3,495,835 | 2/1970 | Laa | 274/4 E |
| 3,524,651 | 8/1970 | Ketzer | 274/4 E |
| 3,385,534 | 5/1968 | Staar | 274/4 E |
| 3,494,572 | 2/1970 | Uemura | 274/4 E |
| 3,395,871 | 8/1968 | Ackermann et al. | 274/4 E |
| 3,419,226 | 12/1968 | Sato | 274/4 E |
| 3,603,595 | 9/1971 | Wada | 274/4 E |

FOREIGN PATENTS OR APPLICATIONS

| | | | |
|---|---|---|---|
| 32,265 | 12/1969 | Japan | 274/4 E |
| 21,026 | 9/1969 | Japan | 274/4 E |

*Primary Examiner*—Leonard D. Christian
*Attorney*—Kelman & Berman

[57] ABSTRACT

Cassette tape recorder for use with a tape cassette having openings for receiving the magnetic heads and the pinch roller at its front side wall and openings for receiving the tape reel driving shafts and the capstan at its upper and lower walls. The tape recorder has a spring biased cassette loading plate movable together with the cassette loaded thereon in the direction parallel to the axes of the reel driving shafts and the capstan toward the inside of the tape recorder with the plane of the cassette loading plate positioned perpendicular to the direction of the movement thereof thereby permitting the cassette to be latched in the operative position engaging with the reel driving shafts and the capstan by latching guide pins of the tape recorder. The magnetic heads and the pinch roller are mounted on a mounting member which is so coupled with the cassette loading plate by coupling means that the magnetic heads and the pinch roller are moved substantially perpendicular to the movement of the cassette loading plate at about the end thereof in the direction toward the openings in the front side wall of the cassette loaded on the cassette loading plate so as to be brought in their operative positions with the tape in the cassette.

9 Claims, 23 Drawing Figures

INVENTOR,
Masaaki Sato
BY: Kelman and Berman
AGENTS

INVENTOR,
Masaaki Sato
BY: Kelman and Berman
AGENTS

INVENTOR,
Masaaki Sato
BY: Kelman and Berman
AGENTS

INVENTOR
Masaaki Sato
BY : Kelman and Berman
AGENTS

INVENTOR.
Masaaki Sato
BY, Kelman and Berman
AGENTS

INVENTOR,
Masaaki Sato
BY: Kelman and Berman
AGENTS

INVENTOR
Masaaki Sato
BY: Kelman and Berman
AGENTS

INVENTOR.
Masaaki Sato
BY: Kelman and Berman
AGENTS

INVENTOR.
Masaaki Sato
BY: Kelman and Berman
AGENTS

INVENTOR.
Masaaki Sato
BY: Kelman and Berman
AGENTS

Patented Oct. 30, 1973 3,768,814

11 Sheets-Sheet 11

INVENTOR,
Masaaki Sato
BY: Kelman and Berman
AGENTS

CASSETTE TAPE RECORDER

BACKGROUND OF THE INVENTION

The present invention relates to a cassette tape recorder and, more particularly, to a cassette tape recorder in which a tape cassette can be loaded and unloaded by a single operation by the operator for the recording or the reproducing of information on the tape in the cassette.

Heretofore, a cassette tape recorder for use with a tape cassette having openings for receiving magnetic heads and a pinch roller of the recorder at the front side wall of the cassette has been developed in which the cassette is inserted into a hollow space of the recorder having the cross-sectional area corresponding to the front side wall of the cassette and a pilot pin provided in the recorder is actuated by the insertion of the cassette so as to shift the driving unit of the recorder coupled with the pilot pin and including the capstan, the tape reel driving shafts, the flywheel and the electric motor in cooperative position with the cassette when the same has been inserted in position in the hollow space and latched in its position, and, at the same time, the magnetic heads and the pinch roller are moved to their cooperative positions with the cassette so that the cassette is operated in the tape recorder.

In such a recorder, however, the tape in the cassette can not be observed when the cassette is being operated, because the major part of the cassette is inserted into the hollow space of the recorder, thereby making it impossible to inspect whether or not the tape is properly actuated during the operation. This is particularly disadvantageous when the tape is actuated for the recording. Further, the size of the recorder is necessarily made large, because the entire driving unit must be moved in the recorder from its inoperative position to its operative position thereby requiring the dead space in the tape recorder and a high mechanical strength is required to the recorder so as to permit the driving unit to be accurately moved in the recorder.

Another cassette tape recorder for use with a tape cassette having an endless tape therein has been developed which is incorporated in a car radio provided in an automobile. However, the prior art tape recorder of the type described above has a large size due to the large diameter of the fly wheel of the driving mechanism of the recorder so that it is difficult to conveniently locate the car radio incorporating therein the tape recorder within the space under the dashboard of the car thereby making the space for the driver narrow and deteriorating the comfortableness of the automobile.

The present invention aims at avoiding the above described disadvantages of the prior art cassette tape recorder.

SUMMARY OF THE INVENTION

An object of the present invention is to provide a novel and useful cassette tape recorder which avoids the above described disadvantages of the prior art cassette type recorder.

Another object is to provide a novel and useful cassette tape recorder of the type described above in which the tape cassette can be loaded on the tape recorder by a single operation of the operator for the recording or the reproducing of the information on the tape therein and unloaded by a single operation of the operator.

A further object of the present invention is to provide a cassette tape recorder of the type described above which is simple in construction and accurate in operation while the tape in the cassette can be observed during the operation thereof so that the false function of the tape recorder is avoided.

A still further object is to provide a novel and useful cassette tape recorder of the type described above which is compact in size and incorporated in a car radio provided in an automobile without deteriorating the comfortableness of the automobile.

The above objects are achieved in accordance with the present invention by the provision of a cassette tape recorder for use with a tape cassette having openings for receiving the magnetic heads and the pinch roller at its front side wall and openings for receiving the tape reel driving shafts and the capstan at its upper and lower walls which is characterized by a spring biased cassette loading plate movable together with the cassette loaded thereon in the direction parallel to the axes of the reel driving shafts and the capstan toward the inside of the recorder with the cassette loading plate and the cassette thereon positioned perpendicular to the direction of the movement thereof so that the cassette is brought to its operative position with the tape reel driving shafts and the capstan so as to be driven thereby, latching guide pins for guiding the loading movement of the cassette and releasably latching the cassette in its operative position, and a mounting member mounting thereon the magnetic heads and the pinch roller and moved in coupled relationship with the movement of the cassette loading plate at about the end thereof so as to move the magnetic heads and the pinch roller substantially perpendicular to the movement of the cassette to their operative positions with the tape in the cassette so as to permit the tape to be actuated for the recording or the reproducing of the informations.

Thus, the cassette is loaded on the tape recorder by a single operation of the operator while the tape in the cassette can be observed during the operation thereof through one of the observation windows formed in the upper and the lower walls of the cassette, because one of the upper and lower walls of the cassette is entirely exposed when the cassette is loaded on the tape recorder.

In accordance with a further feature of the present invention, the cassette tape recorder is incorporated in the casing of a car radio of an automobile with the fly wheel of the driving mechanism of the tape recorder having a large diameter being located in the front part of the casing so as to reduce the size of the casing to be inserted through the dashboard or with the axis of the fly wheel being positioned at an angle to the horizontal so as to reduce the height of the casing so that the casing of the car radio is conveniently located in the space under the dashboard without requiring any dead space deteriorating the comfortableness of the automobile.

DETAILED DESCRIPTION OF THE PREFERRED EMBODIMENTS

Figure 1:
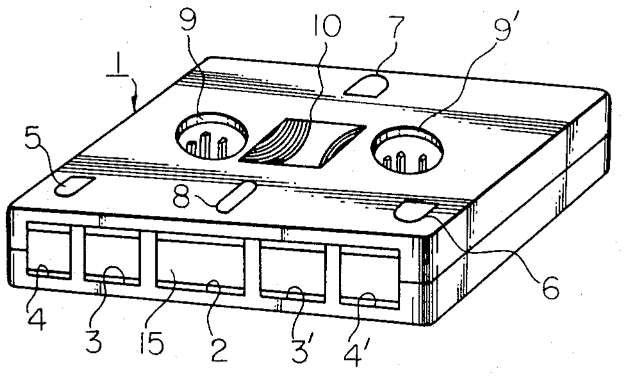
FIG. 1 is a perspective view showing a tape cassette to be used with the cassette tape recorder of the present invention.

Referring to FIG. 1, the tape cassette 1 to be used with the tape recorder of the present invention comprises upper and lower molded halves joined together to form the casing of the cassette. A central opening 2 is formed in the front wall of the casing for receiving the pinch roller of the tape recorder to be described later. Openings 3, 4 and opening 3', 4' are formed in the front wall in symmetrical relationship to each other as shown, the openings 4, 4' being for receiving the erasing head of the tape recorder while the openings 3, 3' are for receiving the recording/reproducing head. A pair of holes 9, 9' are formed in each of the upper and lower walls of the cassette for receiving the tape reel driving shafts of the driving mechanism of the tape recorder. An elongated hole 8 for receiving the capstan of the tape recorder is also formed in each of the upper and lower walls of the cassette as shown. Holes 5, 6 and 7 are formed in each of the upper and lower walls for receiving the respective latching guide pins of the tape recorder so as to guide the loading movement of the cassette on the tape recorder and to releasably latch the cassette in position on the tape recorder as described later. The tape 15 is fed from either one of the pair of tape reels (not shown) to the other tape reel and the tape 15 is guided across the openings 2, 3, 3', 4, 4' along the front wall of the cassette by guide rollers (not shown) in the cassette. An opening 10 in each of the upper and lower walls permits to inspect the tape 15.

Figure 2:
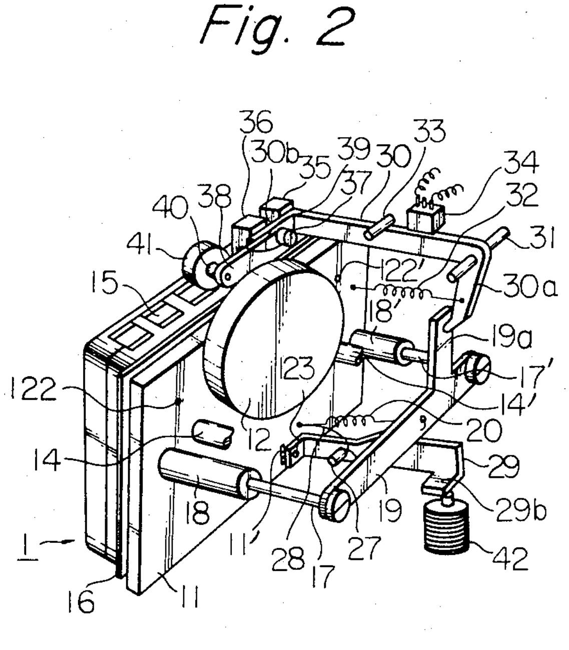
FIG. 2 is a perspective view showing the first embodiment of the cassette tape recorder of the present invention with the casing removed for the showing of the internal construction of the tape recorder.
Figure 3:
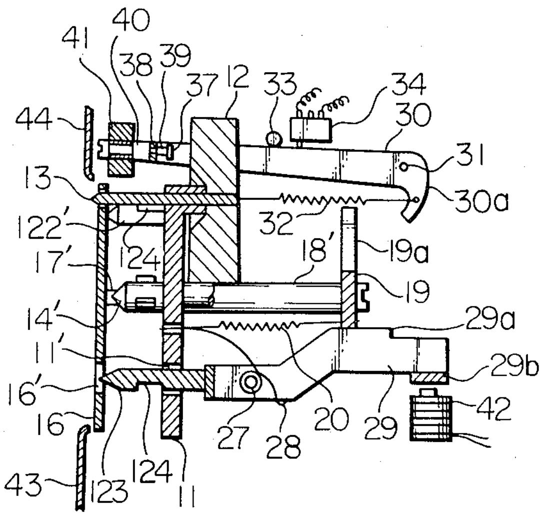
FIG. 3 is a sectional view showing the embodiment of FIG. 1 in its position without loading a cassette thereon.
Figure 4:
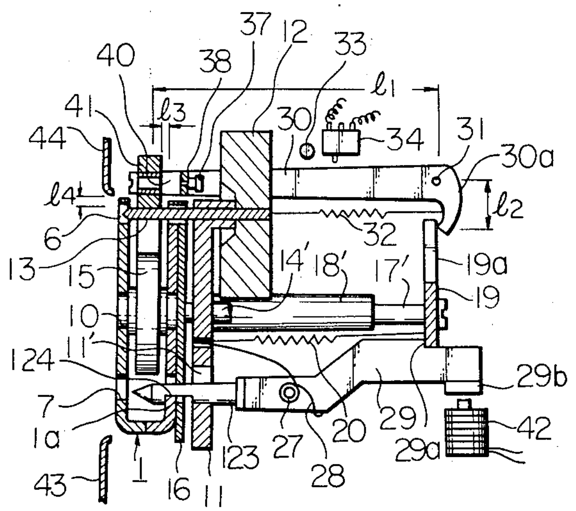
FIG. 4 is a sectional view similar to FIG. 3 but showing the position of the tape recorder in which a cassette is loaded thereon.

In FIGS. 2 – 4 showing the first embodiment of the tape recorder of the present invention, the tape recorder comprises a base plate 11 which carries the driving mechanism of the tape recorder including the fly wheel 12, the capstan 13, the tape reel driving shafts 14, 14', the other parts of the driving mechanism being omitted from the drawings for the clear showing of the present invention.

A pair of hollow mounting posts 18, 18' are fixedly secured to the rear surface of the base plate 11 as shown. Cassette loading plate 16 is provided with a pair of guide shafts 17, 17' fixedly secured thereto which are slidably fitted in the post 18, 18', respectively, so that the cassette loading plate 16 is shiftable relative to the base plate 11. A bridge member 19 having a laterally projecting lug 19*a* is secured to the rear ends of the shafts 17, 17' at its respective ends by set screws as shown and one end of a tension spring 20 is secured to the bridge member 19 while the other end is secured to the base plate 11 so that the cassette loading plate 16 is normally urged forwardly away from the base plate 11.

A pair of stationary latching guide pins 122, 122' are secured to the base plate 11 and extend forwardly through holes formed in the cassette loading plate 16 when the same is moved toward the base plate 11 against the action of the spring 20. A movable latching guide pin 123 is secured at its rear end to the bent lug formed in one end of a swingable lever 29 pivoted about pivot shaft 27 secured to the tape recorder and passes through elongated hole 11' formed in the base plate 11. The movable latching guide pin 123 passes through an elongated hole 16' formed in the cassette loading plate 16 when the same is moved toward the base plate 11. The swingable lever 29 is normally biased counterclockwise by a spring 28 provided around the pivot shaft 27 as seen in the drawings. The swingable lever 29 is formed with a shoulder 29*a* and a bent lug 29*b* at its rear end, and an electromagnet 42 is located beneath the bent lug 29*b* of the lever 29 so that, when the electromagnet 42 is energized, the bent lug 29*b* is attracted as an armature thereby to swing the lever 29 in the clockwise direction against the action of the spring 28.

The latching guide pins 122, 122' and 123 are provided with recessed portions 124, respectively, which are adapted to engage with the respective inner peripheries of the holes 5, 6 and 7 of the cassette 1 to latch the cassette 1 in position when the cassette 1 loaded on the cassette loading plate 16 is moved toward the base plate 11 as described below, but, when the electromagnet 42 is energized, the movable latching guide pin 123 is disengaged from the hole 7 of the cassette 1 to release the latching of the cassette 1 and move it outwardly of the tape recorder together with the cassette loading plate 16 by the action of the spring 20.

The shoulder 29*a* of the swingable lever 29 is so positioned that, when the bridge member 19 is moved rearwardly together with the cassette loading plate 16 mounting thereon a cassette 1, the bridge member 19 abuts against the shoulder 29*a* so as to arrest the bridge member 29 and, at the same time, the latching guide pins 122, 122' and 123 lock the cassette 1 in its operative position.

An L-shaped mounting lever 30 is pivotally mounted on a pivot shaft 31 and the erasing head 35 and the recording/reproducing head 36 are mounted on a bent lug 30*b* formed at one arm of the lever 30 while a tension spring 32 is attached at its one end to the other arm 30*a* of the lever 30 as shown so that the lever 30 is normally urged in the clockwise direction so as to move the heads 35, 36 upwardly in a direction substantially perpendicular to the direction of movement of the cassette loading plate 16. Stopper pin 33 located above the lever 30 limits the clockwise rotation of the lever 30. A swingable lever 38 is swingably mounted at its one end on the bent lug 30b of the lever 30 by pivot shaft 37 and urged downwardly by a spring 39 provided around the pivot shaft 37. A shaft 40 is secured to the free end of the lever 38 and rotatably mounts thereon a pinch roller 41. The downward rotation of the lever 38 is limited by a stopper (not shown) so that the pinch roller 41 is held in a position above the cassette loading plate 16 when the lever 30 is rotated in the clockwise direction and held by the stopper pin 33 as shown in FIG. 3 so as not to prevent the movement of the plate 16 toward the inside of the tape recorder. A microswitch 34 is located adjacent to the upper side of the lever 30 so as to be opened when the lever 30 abuts against the microswitch 34, the microswitch 34 being connected in the electric circuit of the tape recorder.

The casing 43 of the tape recorder has an opening corresponding to the cassette loading plate 16 as shown in FIGS. 3 and 4 so as to permit a cassette 1 loaded on the plate 16 to be moved inwardly together with the plate 16 to its operative position.

The tip of the arm 30*a* of the lever 30 is so positioned that it abuts against the laterally projecting lug 19*a* of the bridge member 19 at about the end of the movement of the cassette loading plate 16 in the direction inwardly of the tape recorder thereby causing the lever 30 to be rotated counterclockwise against the action of the spring 32 so that heads 35, 36 and the pinch roller 41 are urged downwardly.

In operation, a cassette 1 is loaded on the cassette loading plate 16 and moved inwardly of the tape recorder together with the plate 16. Then, the guide pins 122, 122', 123 are inserted into the holes 5, 6 and 7, respectively, and guide the movement of the cassette 1 until the same is latched in its operative position by the guide pins 122, 122' and 123, and, at the same time, the driving shafts 14, 14' engage with the tape reels of the cassette to be ready to drive the same and the capstan 13 is inserted into the hole 8 of the cassette to be ready for feeding the tape 15 in the cassette 1. When the recessed portion 124 of the movable latching guide pin 123 engages with the wall 1a of the cassette 1 loaded on the plate 16, the bridge member 19 is also arrested to the shoulder of the swingable lever 29 mounting the guide pin 123, so that the plate 16 is locked.

When the bridge member 19 is moved to the right in the drawings by the loading of the cassette 1 in position on the tape recorder, the lever 30 is also rotated in the anticlockwise direction at about the end of the movement of the bridge member 19 by the abutment of the tip of the arm 30*a* of the lever 30 against the lug 19*a* of the bridge member 19 so that the heads 35 and 36 and the pinch roller 41 are received in the respective openings of the cassette 1 so as to engage with the tape 15 therein.

At the same time, the microswitch 34 is closed by the disengagement of the lever 30 from the microswitch 34 so that the operation of the tape recorder is automatically commenced.

At the end of the operation of the tape, a signal is generated by an electrically conducting portion of the tape 15, for example, which short-circuits a pair of poles connected in the electric circuit of the electromagnet 42, so that the same is energized to attract the lug 29*b* of the lever 29 so as to rotate the lever 29 in the clockwise direction to disengage the shoulder 29a from the bridge member 19 thereby permitting the cassette loading plate 16 to be moved outwardly of the tape recorder by the action of the spring 20 and, at the same time, the recessed portion 124 of the guide pin 123 is disengaged from the hole 7 of the cassette 1 so as to release the cassette 1 from the tape recorder. The lever 30 is also rotated in the clockwise direction by the action of the spring 32 to move the heads 35, 36 and the pinch roller 41 out of the openings of the cassette 1 when the bridge member 19 is moved outwardly so that the unloading movement of the cassette 1 is not prevented.

In order to insure the proper operation of the device, the relative dimensions of the elements are preferred to be selected as follows:

$$l_1/l_2 = 6$$

$$l_4 = 2$$

$$l_3 > 0.33\ l_4 = 0.4$$

where:

$l_1$ = distance between the heads 35, 36 (or the pinch roller 41) and the pivot shaft 31 of the lever 30 in FIG. 4

$l_2$ = distance between the pivot shaft 31 and the tip of the arm 30*a*

$l_3$ = distance between the inner surface of the bottom wall of the cassette 1 loaded on the plate 16 and the opposing surface of the pinch roller 41 (or the heads 35, 36)

$l_4$ = vertical clearance between the upper inner periphery of the opening of the casing and the upper side wall of the cassette 1 in FIG. 4

FIGS. 5 – 8 show the second embodiment of the present invention. This embodiment is substantially similar to that of FIG. 2 except that the base plate 11 mounting thereon the driving mechanism is movably mounted in the tape recorder and the base plate 11 is moved inwardly at the end of the loading movement of the cassette 1 on the cassette loading plate 16 so as to move the heads 35, 36 and the pinch roller 41 into engagement with the tape 15 of the cassette 1 loaded on the plate 16.

Figures 5, 6, 7:
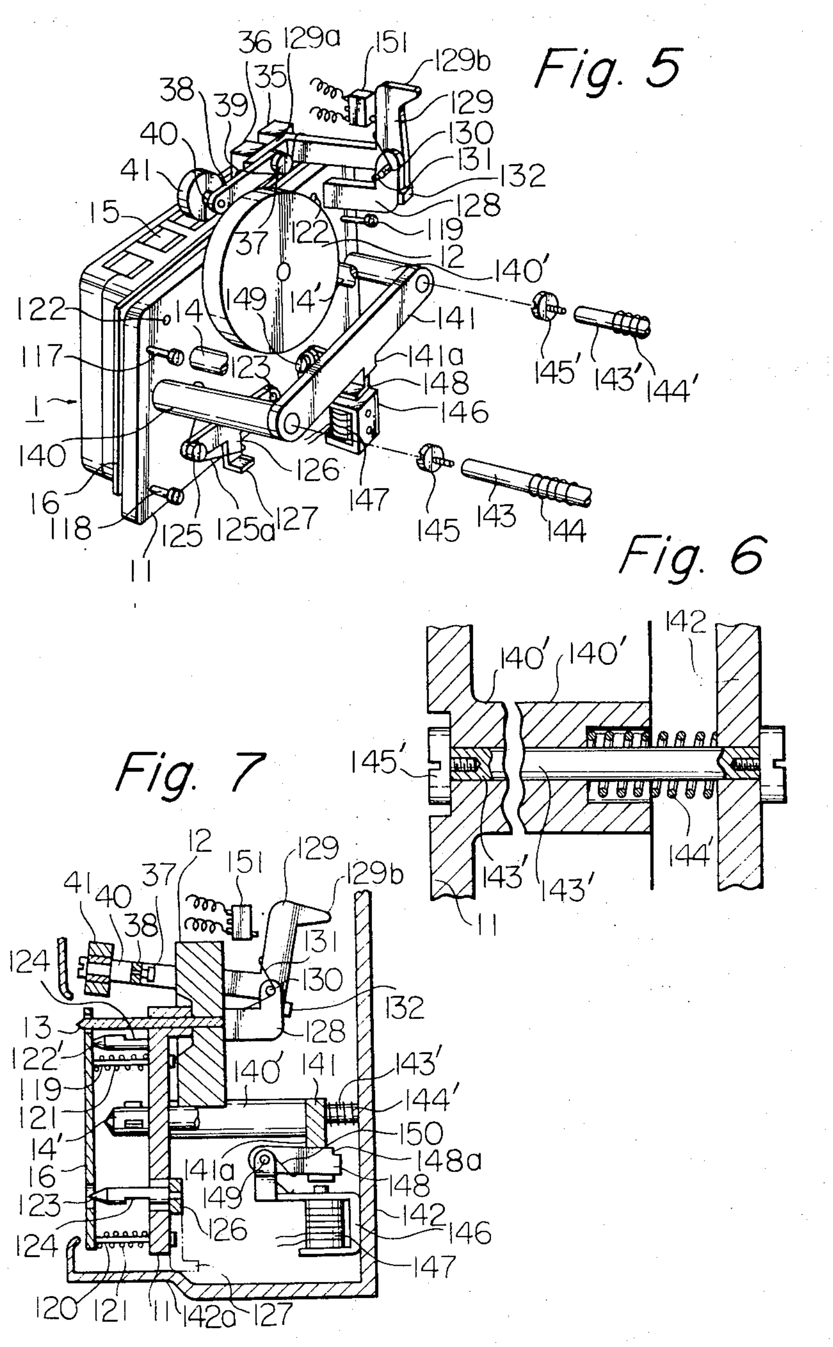
FIG. 5 is a perspective view showing the second embodiment of the tape recorder of the present invention.
FIG. 6 is a fragmentary sectional view showing the spring biased sliding engagement of the base plate supporting pin secured to the casing of the tape recorder with the hollow mounting pole secured to the shiftable base plate of the tape recorder.
FIG. 7 is a sectional view showing the embodiment of FIG. 5 in its position without loading a cassette.

To this end, a pair of supporting pins 143, 143' secured to the casing 142 of the tape recorder are slidably fitted in the holes of the hollow mounting posts 140, 140', respectively, as shown in FIGS. 5 and 6, and the poles 140, 140' are urged outwardly by springs 144, 144' located around the respective pins 143, 143' between the casing 142 and the enlarged portions of the holes in the posts 140, 140', respectively, and the outward movement of the base plate 11 is limited by screws 145, 145' as shown in FIG. 6. The cassette loading plate 16 is movably mounted on the base plate 11 by headed guide pins 117 to 120 secured to the plate 16 and slidably fitting in respective guide holes of the base plate 11. Springs 121 are provided around the pins 117 to 120 between the plate 11 and the plate 16 so as to urge the cassette loading plate outwardly away from the base plate 11.

An electromagnet 147 is mounted on a bracket 146 secured to the casing 142 and a lever 148 having an arresting shoulder **148*a* is pivotally mounted on the bracket 146 by a pivot shaft 149 above the electromagnet 147 and biased counterclockwise by a spring 150 arranged around the pivot shaft 149. The position of the lever 148 is so determined that the lug 141*a* of the bridge member 141 bridging the posts 140, 140' is arrested by the shoulder 148*a* of the lever 148 when the base plate 11 is moved inwardly at the end of the cassette loading movement of the plate 16 while the shoulder 148*a* is disengaged from the lug 141*a* when the electromagnet 147 is energized to attract the lever 148 so as to move the base plate 11 outwardly by the action of the springs 143, 143'.**

Figure 8:
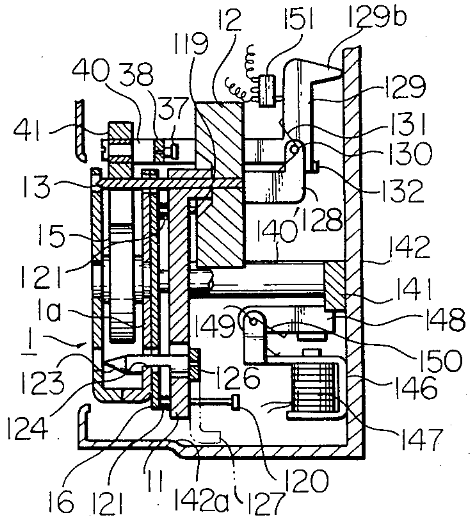
FIG. 8 is a sectional view similar to FIG. 7 but showing the position of the tape recorder of FIG. 7 in which a cassette is loaded thereon.

The movable guide pin 123 is secured to the free end of a swingable lever 126 pivotally mounted on the plate 11 by a pivot shaft 125 and biased in the clockwise direction by a spring **125*a* provided around the pivot shaft 125. The lever 126 is formed with a bent lug 127 which slidably engages with the inner bottom surface of the casing 142 provided with an inclined stepped portion 142*a* adjacent to the lug 127 as shown in FIGS. 7 and 8. Thus, the movable guide pin 123 is moved to lock the cassette 1 when the same is mounted on the plate 16 and moved inwardly so as to move the base plate 11 inwardly so that the lug 127 is slidingly moved downwardly along the inclined stepped portion 142*a* of the casing 142 as shown in FIG. 8, while the guide pin 123 is moved in the position disengaged from the hole 7 of the cassette 1 when the base plate 11** is moved outwardly.

The mounting lever 129 corresponding to the lever 30 of FIG. 2 and mounting thereon the heads 35, 36 and the pinch roller 41 is pivotally mounted on a bracket 128 secured to the base plate 11 by a pivot shaft 130 and urged in the clockwise direction by a spring 131 provided around the pivot shaft 130. Stopper 132 formed in the lever 129 serves to limit the movement of the lever 129. A normally opened microswitch 151 connected to the electric circuit of the tape recorder is located adjacent to the lever 129 so as to be closed when the lever 129 contacts with the microswitch 151. The lever is formed with a laterally bent lug **129*b* adapted to abut against the casing 142 when the base plate 11 is moved inwardly so that the lever 129 is rotated in the anticlockwise direction to move the heads 35, 36 and the pinch roller 41 into their operative position with the tape 15 of the cassette 1 while the microswitch 151 is actuated as shown in FIG. 8** so as to close the electric circuit of the tape recorder.

When the cassette 1 is loaded on the cassette loading plate 16 and moved inwardly of the tape recorder, the base plate 11 is also moved after the springs 121 are completely compressed so that the cassette 1 is locked in its operative position by the guide pins 122, 122' and 123 by the downward movement of the lever 126 along the stepped portion **142*a* and the base plate 11 is locked by the engagement of the shoulder 148*a* of the lever 148 with the lug 141*a* of the bridge member 141 while the heads 35, 36 and the pinch roller 41 are brought to their operative positions by the abutment of the lug 129*b* of the lever 129 against the casing 142 and the microswitch 151 is closed so as to automatically commence the operation of the tape recorder. At the end of the operation of the tape, the electromagnet 147 is energized in like manner as described in connection with the embodiment of FIG. 2 so that the operation of the tape recorder is automatically stopped and the cassette 1** is released from the tape recorder.

Figure 9:
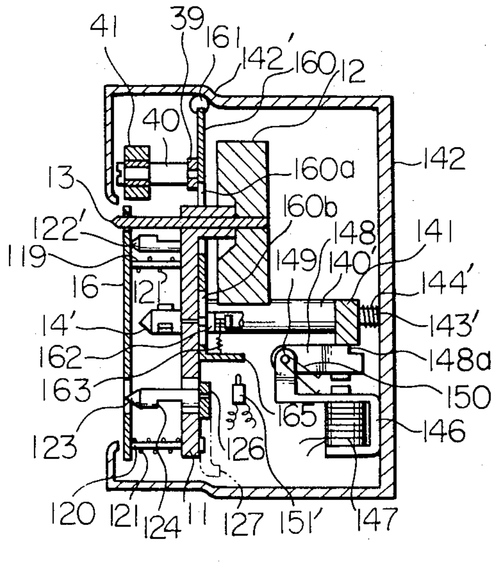
FIG. 9 is a sectional view similar to FIG. 7 but showing a modification of the embodiment of FIG. 7 in its position without loading a cassette.
Figure 10:
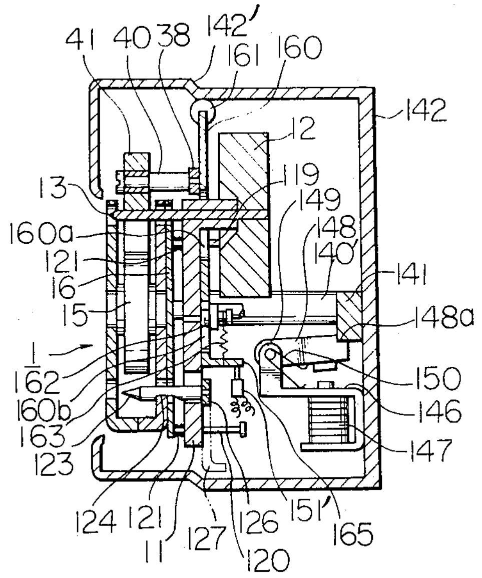
FIG. 10 is a view similar to FIG. 9 but showing the position of the tape recorder of FIG. 9 in which a cassette is loaded thereon.

FIGS. 9 and 10 show a modification of FIG. 5. In this embodiment, the mounting lever 129 is replaced by a shiftable plate 160 slidably mounted on the base plate 11 by guide pins 162 slidably fitting in elongated holes **160*b* of the plate 160. The plate 160 is provided with an upstanding lug 165 and a spring 163 is attached at its one end to one of the guide pins 162 while the other end is attached to the lug 165 so that the plate 160 is normally urged upwardly. A normally opened microswitch 151' is located adjacent to the lug 165 so as to be closed when engaged therewith. A roller 161 is rotatably mounted on the upper end of the plate 160 so that the roller 161 resiliently engages the casing 142 and the casing 142 is provided with an inclined stepped portion 142' adjacent to the roller 161 so that the plate 160 is moved downwardly when the base plate 11 is moved inwardly of the tape recorder to move the roller 161 along the stepped portion 142' by the cassette loading movement of the plate 16 thereby permitting the heads 35, 36 and the pinch roller 41** to be brought to their operative positions.

Figure 11:
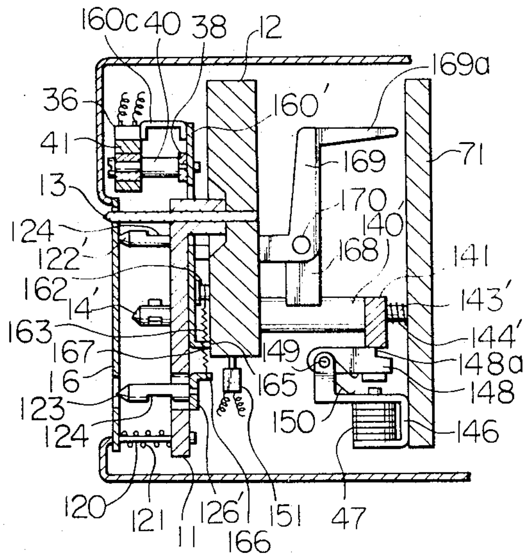
FIGS. 11 and 12 are sectional views similar to FIGS. 9 and 10, respectively, but showing a further modification of the embodiment of FIG. 7.
Figure 12:
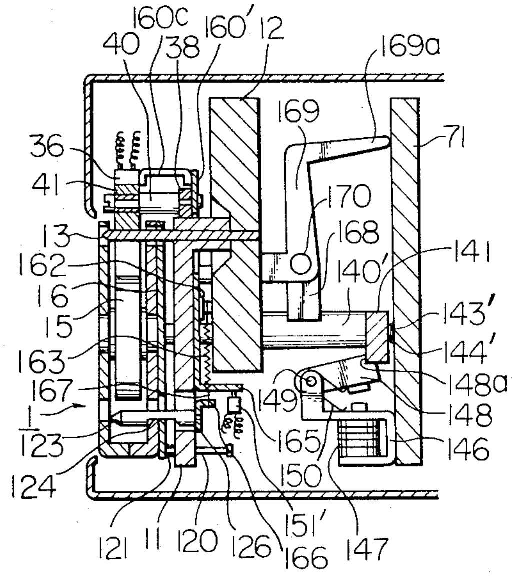

FIGS. 11 and 12 show a further modification of FIG. 9. In this embodiment, the roller 161 of the plate 160 and the lug 127 of the lever 126 shown in FIG. 9 are dispensed with together with the stepped portion 142' and **142*a* and, instead, the plate 160' in FIG. 11 similar to the plate 160 in FIG. 9 is coupled with a swingable lever 169 by means of a bifurcation of the plate 160' (not shown), The lever 169 has a bent lug 169*a* adapted to abut against a stationary plate 71 in the tape recorder when the base plate 11 is moved inwardly of the tape recorder so as to swing the lever 169 in the direction in which the plate 160' is moved downwardly. The lever 126' similar to the lever 126 in FIG. 9 has a bent lug 166 and a compression spring 167 is arranged between the bent lug 165 of the plate 160' and the bent lug 166 of the lever 126' so that the guide pin 123 is moved downwardly to lock the cassette when the plate 160'** is moved downwardly.

The operation of the embodiment of FIG. 11 is substantially similar to that of FIG. 9.

Figure 13:
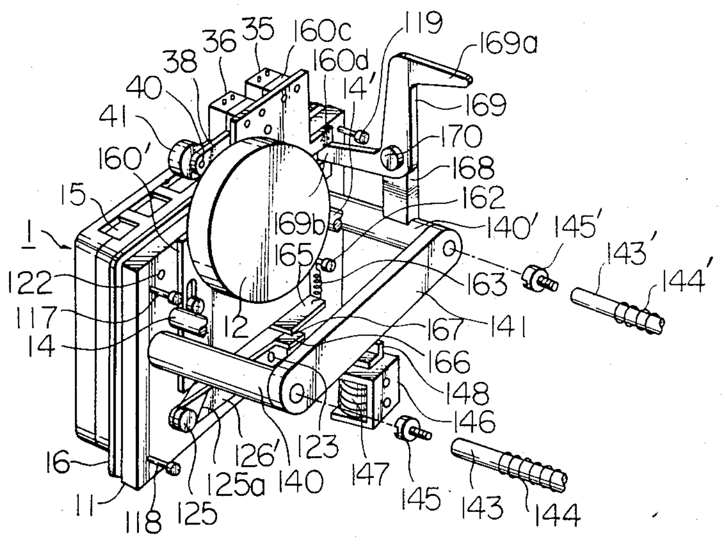
FIG. 13 is a perspective view showing the third embodiment of the cassette tape recorder of the present invention with the casing removed to show the internal construction.
Figure 14:
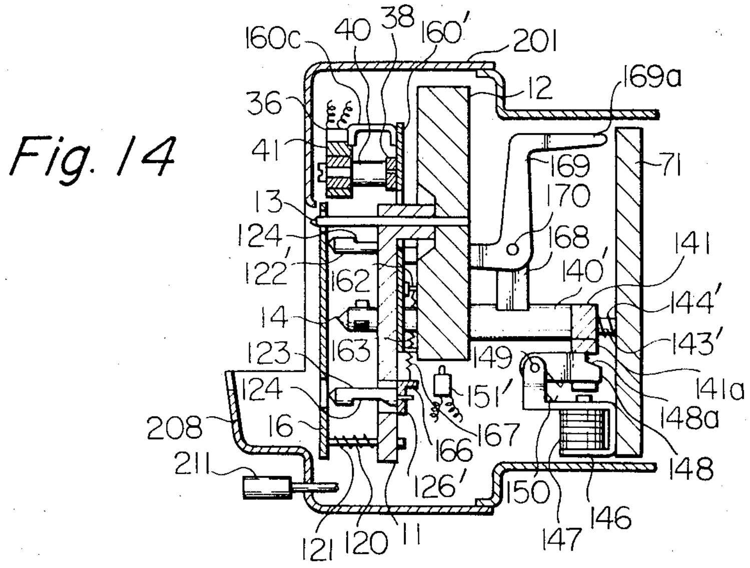
FIG. 14 is a sectional view showing the tape recorder of FIG. 13 in its position without loading a cassette.
Figure 15:
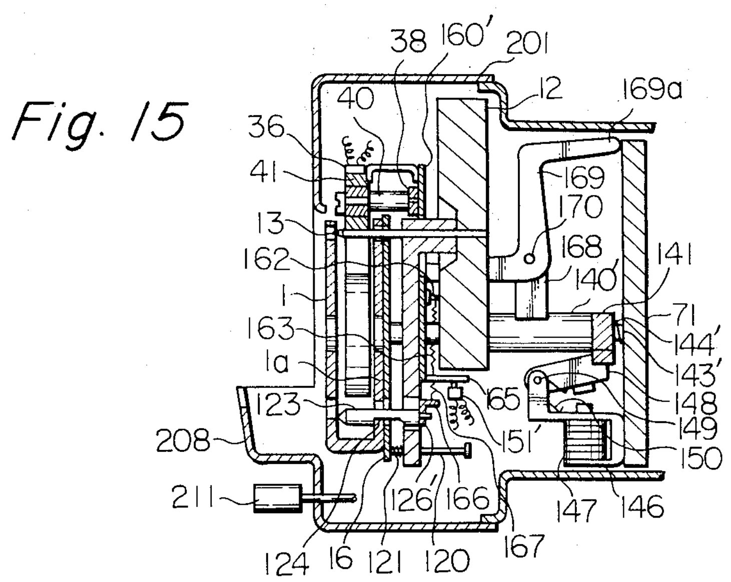
FIG. 15 is a sectional view similar to FIG. 14 but showing the position in which a cassette is loaded on the tape recorder.

FIGS. 13 to 18 show a third embodiment of the tape recorder of the present invention which is incorporated in a car radio of an automobile. The tape recorder per se shown in FIGS. 13 to 15 is substantially similar in construction and operation to that of FIG. 11 and, therefore, the detailed description is omitted.

Figure 16:
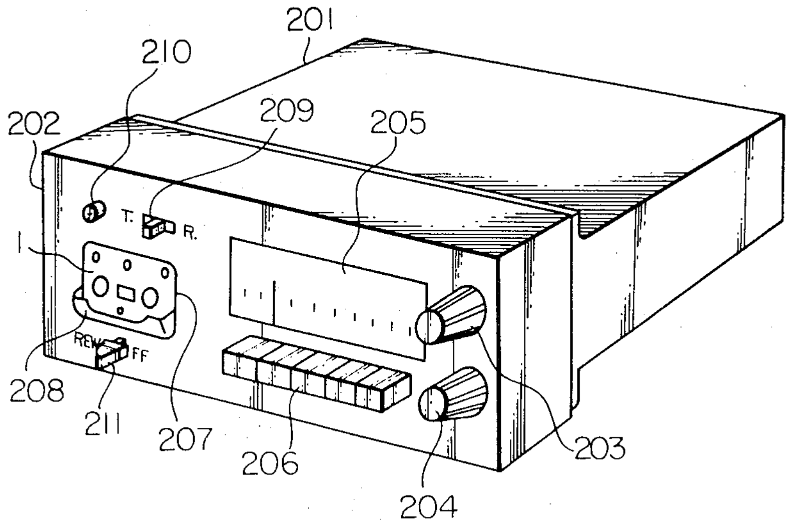
FIG. 16 is a perspective view showing the tape recorder of FIG. 13 incorporated in a car radio of an automobile.

In FIGS. 14 to 16, the casing 201 of the car radio comprises a front panel portion 202 having a greater height than the main portion of the casing 201 but having a relatively small depth in which the driving mechanism of the tape recorder including the large diameter fly wheel 12 is arranged. The front panel portion 202 has in its front wall a receiving pocket 208 beneath the opening 207 for receiving the cassette released from the tape recorder.

Figure 17:
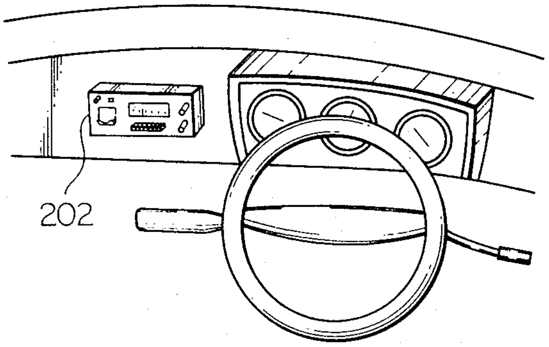
FIG. 17 is a fragmentary perspective view showing the car radio arranged in the dashboard of an automobile.

As shown in FIG. 16, a main switch 203 serving also as a volume control knob, a tuning knob 204, a dial indicator 205, selector push buttons 206, the opening 207, the pocket 208, a switching knob 209 for switching the connection from the radio to the tape recorder and vice versa, a cassette knock out button 210 for promptly releasing the cassette at any time desired during the operation, and a quick feeding and rewinding knob 211 are arranged in the front panel. As shown, the tape recorder is located at the left in the front panel portion 202. The side by side arrangement of the radio and the tape recorder in the casing 201 permits the height of the casing 201 to be reduced so that the casing 201 is mounted conveniently in the dashboard of the automobile as shown in FIG. 17. Only a thin front panel portion 202 projects from the dashboard without inconveniencing the driver in the car.

Since the stability of the operation of the tape recorder is increased as the diameter of the fly wheel is increased, the arrangement of the tape recorder in the front part of the casing 201 as shown in FIG. 16 is very advantageous for a car radio.

Figure 18:
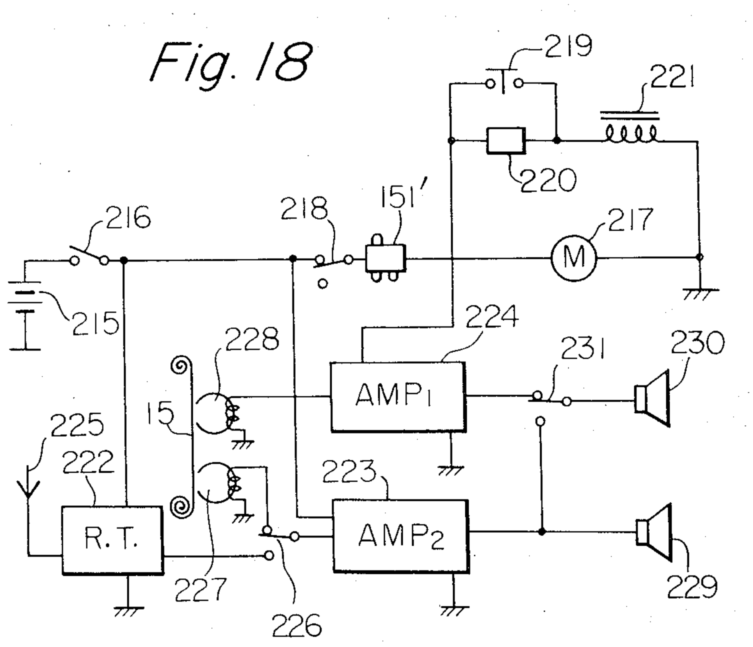
FIG. 18 is a diagram showing the electric circuit of the car radio of FIG. 13.

FIG. 18 shows the electric circuit of the car radio of FIG. 16 incorporating the tape recorder shown in FIGS. 13 – 15.

The electric circuit shown in FIG. 18 comprises an electric source 215, a main switch 216 coupled with the knob 203 in FIG. 16, a driving motor 217 of the tape recorder, a change over switch 218 connected in series with the switch 216 and the motor 217 and coupled with the knob 209 in FIG. 16, the microswitch 151' connected between the switch 218 and the motor 217, a parallel circuit comprised of a cassette knock out switch 219 and a circuit 220 including, for example, a pair of poles adapted to be short-circuited by the electrically conductive portion of the tape for automatically stopping the operation of the tape recorder, and a solenoid 221 connected in series to the parallel circuit of the switch 219 and the circuit 220, the solenoid 221 actuating the electromagnet 147 of FIG. 13.

The cassette knock out switch 219 is operated by the knock out button 210 so as to immediately stop the operation of the tape recorder and release the cassette during the operation.

A pair of magnetic heads 227 and 228 are provided for the stereoplay of the tape, the heads 227 and 228 being connected to amplifiers 223, 224, respectively, with a change over switch 226 coupled with the knob 209 and connected between the head 227 and the amplifier 223. A radio tuner 222 connected to and antenna 225 is connected to the switch 226. The amplifiers 223, 224 are connected to speakers 229, 230, respectively, with a switch 231 coupled with the knob 207 and connected between the amplifier 224 and the speaker 230. One contact of the switch 231 is connected to the amplifier 223 so as to connect the speaker 230 to the amplifier.

The electric source 215 is connected through the switch 216 to the radio tuner 222 and the amplifier 223 while the amplifier 224 is connected to the electric source 215 through the switches 216, 218 and the microswitch 151'.

In operation, the current is supplied to the radio tuner 222 and the amplifier 223 through the switch 216 when closed and the amplifier 224 is supplied with the current from the electric source 215 through the switches 216, 218 and the microswitch 151' when they are closed.

In the positions of the switches 218, 226 and 231 shown in FIG. 18, the electric circuit is operated for the stereo-reproduction of the tape 15 by the magnetic heads 227, 228.

When a cassette is loaded on the tape recorder through the opening 207 shown inFIG. 16, the microswitch 151' is closed so as to drive the motor 217 and energize the amplifier 224, the amplifier 223 being energized by the switch 216. The heads 227, 228 reproduce the informations recorded in the two tracks on the tape 15, and the reproduced informations are amplified by the amplifiers 223, 224 and supplied to the speakers, respectively.

When the knock out switch 219 or the circuit 220 is actuated, the operation of the tape recorder is stopped and the cassette is released from the tape recorder by means of the solenoid 221 energized to actuate the electromagnet 147 so as to release the base plate 11 and the microswitch 151' opened by the releasing movement of the lever 169 to shift the plate 160' upwardly thereby deenergizing the motor 217 and the amplifier 224 and the solenoid 221.

When the radio is to be operated, the knob 209 is operated to switch the switches 218, 226 and 231 so that the microswitch 151' is disconnected from the electric source 215 so as to deenergize the amplifier 224 and the radio tuner 22 is connected to the amplifier 223 instead of the head 227 while the speaker 230 is connected to the amplifier 223 instead of the amplifier 224, thereby energizing the radio tuner 222 and the amplifier 223 by the electric source 215 to operate both the speakers 229, 230.

It is evident that the tape 15 is not operated even though the cassette is loaded on the tape recorder insofar as the switches 218, 226 and 231 are positioned for the operation of the radio.

Figure 23:
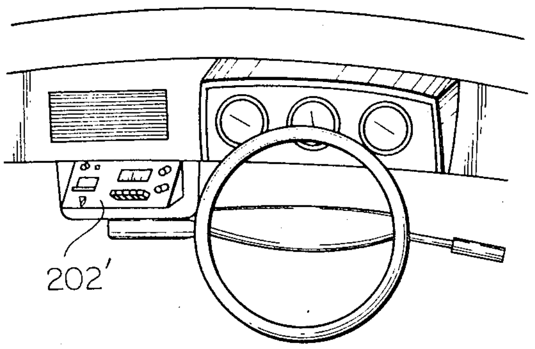
FIG. 23 is a fragmentary perspective view showing the car radio of FIG. 22 arranged in the dashboard of an automobile.

FIGS. 19 to 23 show the fourth embodiment of the present invention. This embodiment is substantially similar in construction and operation to that of FIGS. 13 to 18 except that the axis of the fly wheel 12 is located at an angle, preferrably at an angle of 45°, to the horizontal so as to reduce the vertical dimension of the fly wheel so that the height of the casing of the car radio incorporating therein the tape recorder is reduced thereby permitting the casing to be substantially entirely located within the dashboard of an automobile as shown in FIG. 23.

Figure 19:
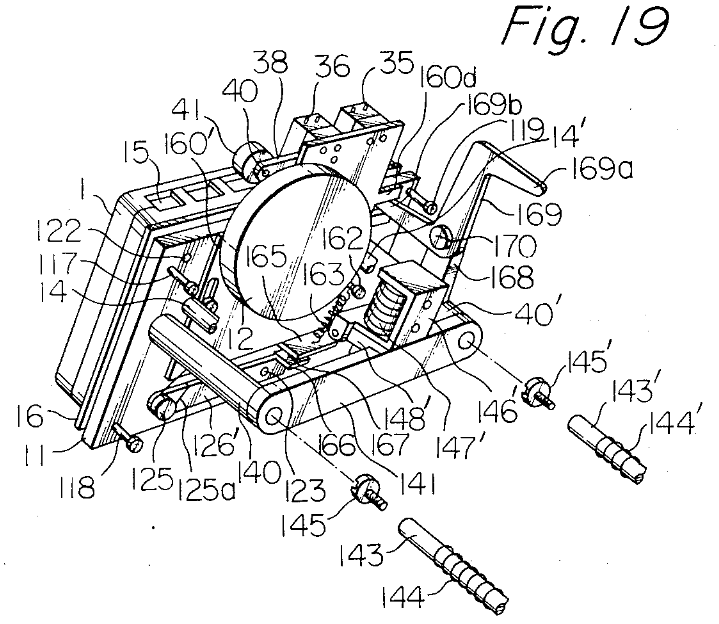
FIG. 19 is a perspective view showing the fourth embodiment of the tape recorder of the present invention.
Figure 20:
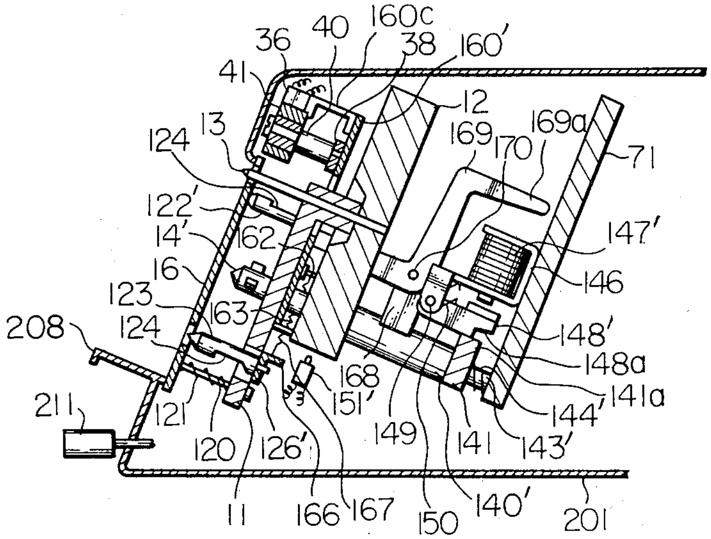
FIG. 20 is a sectional view showing the tape recorder of FIG. 19 in its position without loading a cassette.
Figure 21:
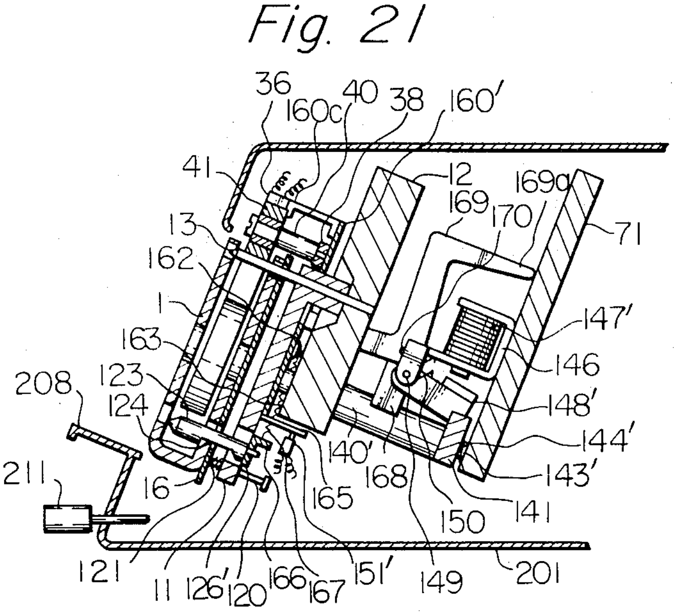
FIG. 21 is a sectional view similar to FIG. 20 but showing the tape recorder of FIG. 19 in its position in which a cassette is loaded thereon.
Figure 22:
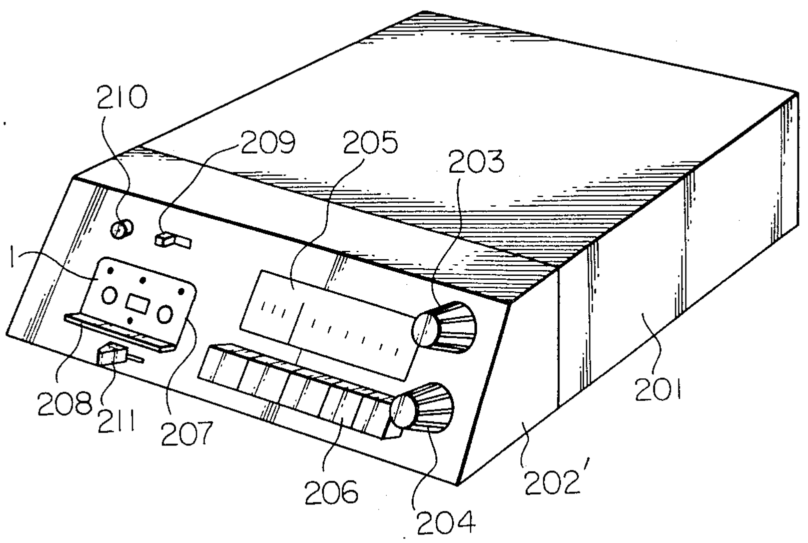
FIG. 22 is a perspective view showing a car radio incorporating therein the tape recorder of FIG. 19.

To this end, the electromagnet 147' and the lever 148' are located in the inverted positions in comparison with the electromagnet 147 and the lever 148 shown in FIG. 13 so as to reduce the space beneath the posts 140, 140'. The operation of these elements shown in FIG. 19 is similar to those shown in FIG. 13.

Thus, the casing 201 has the front panel portion 202' with the front surface inclined to facilitate the operation.

I claim:

1. In a cassette tape recorder for use with a tape cassette having openings in a front wall for receiving magnetic heads and a pinch roller of the tape recorder, openings in walls transverse to said front wall for receiving tape reel driving shafts and a capstan, and guide holes in said transverse walls for receiving latching guide pins of the tape recorder, the improvement which comprises:

a. a base carrying said tape reel driving shafts and said capstan;

b. a cassette loading plate mounted on said base plate for movement parallel to the axes of said tape reel driving shafts and said capstan, 1. said cassette loading plate extending in a plane transverse to said axes;

c. spring means operatively interposed between said cassette loading plate and said base plate for biasing said cassette loading plate away from an operative position adjacent said base plate and outwardly of said tape recorder;

d. latching guide pins mounted on said base plate for engaging said guide holes in a cassette loaded on said cassette loading plate when the cassette is moved inwardly of the tape recorder together with said cassette loading plate, and for releasably latching said cassette in the operative position of said cassette loading plate while said tape reel driving shafts and said capstan respectively engage tape reels and a tape in said cassette;

e. a lever member carrying said magnetic heads and said pinch roller;

f. pivot means connecting said member to said base plate for movement of said magnetic heads and said pinch roller transversely to the direction of movement of said cassette loading plate toward and away from said openings in said front wall; and g. means coupling said cassette loading plate to said member for moving the member in timed sequence with the movement of the cassette loading plate, and for thereby causing said magnetic heads and said pinch roller to be received in said openings in the front wall of a cassette loaded on said cassette loading plate when the latter enters said operative position thereof.

2. In a cassette tape recorder as set forth in claim 1, yieldably resilient means biasing said lever member away from a position in which said magnetic heads and said pinch roller are received in the openings of a cassette loaded on said cassette loading plate in the operative position of the latter and for withdrawing said magnetic head and said pinch roller from said openings, said latching guide pins engaging said cassette loading plate in said operative position thereof and holding the same in said operative position when said guide pins engage said cassette, and release means for simultaneously releasing said guide pins from engagement with said cassette and with said cassette loading plate, said release means including an electromagnet, an armature attracted to said electromagnet when the same is energized, and connecting means operatively connecting said armature to said guide pins for releasing the same in response to the energizing of said electromagnet.

3. In a cassette tape recorder as set forth in claim 2, a casing, said base plate being fixedly mounted in said casing, said cassette loading plate carrying a plurality of guide shafts slidably received in said base plate, a bridge member connecting said guide shafts, said spring means being interposed between said base plate and said bridge member, said lever member having an arm located adjacent said bridge member for engagement thereby, said arm and said bridge member constituting said coupling means.

4. Cassette tape recorder according to claim 3, a swingable lever pivotally mounted at its intermediate portion in the tape recorder with said armature and its one end mounting thereon one of said latching guide pins while the other end is formed with a shoulder engageable with said bridge member when said cassette loading plate is moved toward the inside of the tape recorder, spring means provided on said swingable lever to urge the same in the direction to move said one of said latching guide pins to its latching position with the mating guide holes of the cassette loaded on said cassette loading plate while said shoulder of said swingable lever is engaged with said bridge member to arrest the same when said cassette loading plate is moved toward the inside of the tape recorder, said electromagnet being provided adjacent to said other end of said swingable lever for rotating the same in the direction to disengage said shoulder from said bridge member and said one of said latching guide pins from the mating guide hole of the cassette when said electromagnet is energized so as to release said cassette from the tape recorder.

5. Cassette tape recorder according to claim 3, further comprising a microswitch connected to the electric circuit of the tape recorder and located adjacent to said lever member so as to be closed when said L-shaped lever member is moved to bring said magnetic heads and said pinch roller to their operative positions with the tape in the cassette loaded on said cassette loading plate thereby permitting the tape recorder to be automatically operated when said cassette loading plate has been brought to its operative position.

6. In a cassette tape recorder as set forth in claim 2, guide means guiding said cassette loading plate on said base plate in the direction of said axes, a casing, supporting means securing said base plate to said casing for movement in the direction of said axes, yieldably resilient means interposed between said casing and said base plate for biasing the base plate outward of said lever member having an arm abuttingly engaging said casing when said cassette loading plate and said base plate are moved inward of said tape recorder against the restraint of said spring means, another arm of said lever member carrying said magnetic heads and said pinch roller, said other arm being moved by abutting engagement of said one arm to insert said magnetic heads and said pinch roller into a cassette loaded on said cassette loading plate.

7. In a cassette tape recorder as set forth in claim 6, said supporting means including hollow mounting posts secured to said base plate and supporting pins fixedly secured to said casing and slidably received in said posts.

8. Cassette tape recorder according to claim 7, further comprising a lever pivotally mounted on said base plate and carrying one of said latching guide pins, said lever having a lug, an inclined stepped portion formed in said casing at a position adjacent to said lug so that said lug is moved along said stepped portion when said base plate is moved inwardly of the tape recorder so as to move said one of said latching guide pins to latchingly engage with the mating guide holes of the cassette loaded on said cassette loading plate, a bridge member secured to said hollow mounting posts, a swingable lever pivotally mounted in the tape recorder adjacent to the path of movement of said bridge member and urged by a spring toward said bridge member, said swingable lever having a shoulder adapted to engage with said bridge member when said base plate is moved inwardly of the tape recorder so as to latch said bridge member, and carrying said armature, said electromagnet being located adjacent to said swingable lever so as to attract the same to disengage said shoulder from said bridge member when energized.

9. Cassette tape recorder according to claim 7, further comprising a normally opened microswitch connected to the electric circuit of the tape recorder and located adjacent to said lever member so as to be closed when said lever member is rotated as said base plate is moved inwardly of the tape recorder to latch the cassette thereby permitting the operation of the tape recorder to be automatically commenced when said cassette loading plate has been brought to its operative position.

* * * * *